May 10, 1955     K. W. FRIES ET AL     2,708,177
LAMINATED PAPER PRODUCT
Filed June 13, 1952
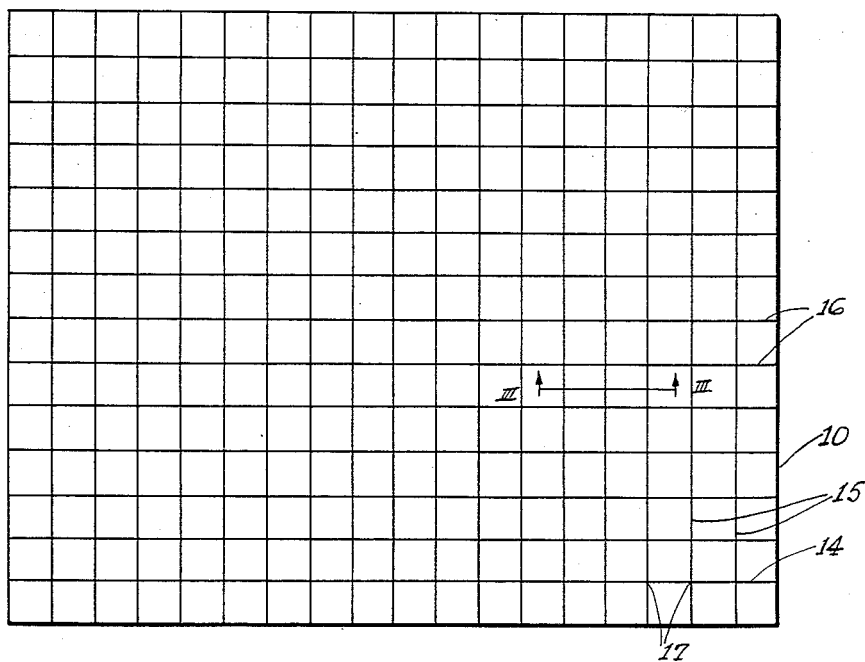
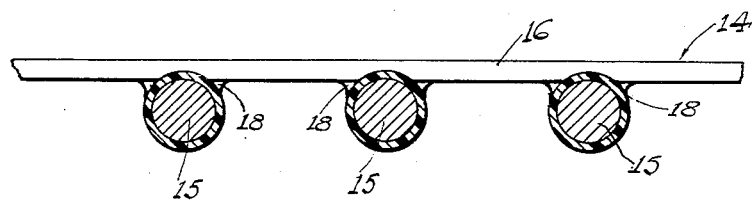
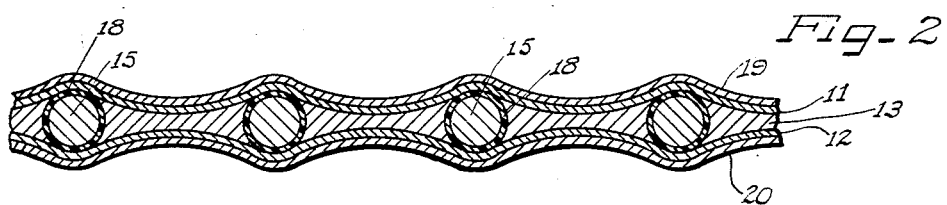
Inventors
Karl W. Fries &
Gustav Becker
by Hill, Sherman, Meroni, Gross & Simpson
Attys

United States Patent Office 2,708,177
Patented May 10, 1955

2,708,177
LAMINATED PAPER PRODUCT

Karl W. Fries and Gustav Becker, Rhinelander, Wis., assignors to Rhinelander Paper Company, Rhinelander, Wis., a corporation of Wisconsin Application June 13, 1952, Serial No. 293,394

4 Claims. (Cl. 154—52)

The present invention is directed to an improved reinforced, laminated paper structure having the properties of high moisture vapor-proofness, extremely high tear strength, and high grease-proofness.

The paper products of the present invention, because of their resistance to water vapor transmission and their high tear strength are particularly useful as a wrapper for food and other products.

The wrapper of the present invention comprises a lamination of glassine paper, a laminant having moisture vapor-proofing properties bonding together the plies of glassine paper, and a glass fiber scrim interposed between the glassine paper and embedded in the laminant. The combination of the glassine paper plies, the laminant, and the network of glass fiber scrim produces a laminated structure, the vapor penetration resistance of which is retained even after repeated creasing.

An object of the present invention, therefore, is to provide an improved laminated paper product having high moisture vapor-proofness, extremely high tear strength, and high grease-proofness properties.

Another object of the present invention is to provide an improved laminated paper product suitable for wrapping purposes composed of sheets or webs of translucent glassine paper bonded together with a laminant having high resistance to moisture vapor transmission, and having embedded therein reinforcing glass strands.

Another object of the present invention is to provide an improved laminated paper product which retains its moisture-vapor-proofness even after repeated creasing.

Another object of the present invention is to provide a laminated wrapper of the type described having a heat sealing, moisture vapor-proof film on one or both surfaces thereof.

A further description of the present invention will be made in connection with the attached sheet of drawings which illustrate one preferred embodiment of the present invention.

In the drawings:

Figure 1 is a plan view of the laminated paper product of the present invention;

Figure 2 is an enlarged cross-sectional view of the glass scrim itself, and

Figure 3 is a greatly enlarged, cross-sectional view taken substantially along the line III—III of Figure 1, showing a film on both surfaces.

As shown on the drawings:

The reference numeral 10 indicates generally the laminated paper product of the present invention composed of a pair of superimposed glassine paper plies 11 and 12 (Fig. 3) bonded together by a moisture vapor-proofing laminant 13. Interposed between the glassine plies 11 and 12 in the laminant 13 is a glass fiber fabric 14, preferably of reticulate form, including a plurality of generally parallel strands 15 in the machine direction of the paper, and generally parallel strands 16 in the cross-machine direction of the paper. The scrim network 14 is held together at the intersections 17 between the strands 15 and 16 by a coating 18 on at least one set of the strands. The coating 18 is preferably formed of a tacky, water-repellant composition, such as asphalt, resins or the like. Where the black color of asphalt might be objectionable for wrapping purposes, a tacky, synthetic resin such as an oil-modified alkyl or phenolic resin, or a polyester resin, which is transparent and colorless, can be used in place of the asphalt.

The laminant composition 13 may consist solely of microcrystalline wax, or may contain a combination of microcrystalline wax, a low molecular weight polyisobutylene (such as that sold commercially as Vistanex LM) and a resin. The preferred microcrystalline wax for use in the papers of the present invention is that group of waxes which has a melting point in the range from about 150 to 160° F. Such microcrystalline waxes have sufficient permanent tackiness and flexibility to insure a continuous film even when severally flexed or creased.

The resin employed in the laminant should have some adhesive properties, and may consist of natural resins such as rosin, ester gum, hydrogenated rosin, or a suitable synthetic resin. In place of the polyisobutylene mentioned, materials such as that known commercially as Vistac (polymerized isoolefins having a molecular weight in the range from about 500 to 1500) or a butyl rubber (such as a vulcanizable copolymer containing about 98% isobutylene, and 2% isoprene) may be employed.

A preferred laminating composition includes the following ingredients in the percentages indicated:

| Ingredient: | Per cent by weight |
|---|---|
| Paxwax 305 (microcrystalline wax) | 65–85 |
| Staybelite resin (hydrogenated rosin) | 5–25 |
| Vistac | 1–10 |
| Mipol (rubber-like polymer combined with microcrystalline wax) | 2–15 |

A specific laminant within the ranges indicated has the following composition:

| | Per cent |
|---|---|
| Paxwax 305 | 75.5 |
| Staybelite resin | 15.0 |
| Vistac | 2.5 |
| Mipol | 7.0 |

The above composition of laminant has excellent bonding properties toward both the glass fibers and the glassine, and has a sufficiently permanent tackiness and flexibility, together with sufficient inherent cohesiveness to resist any normal stresses tending to separate the plies or disrupt the continuity of the laminant layer. At the same time the plastic nature of the laminant composition provides for relative slippage between the surfaces bonded thereby, so that in tearing, for instance, there is movement of the strand relative to the plies under the tearing stress applied thereto before the strand itself is subjected to the full force of the tearing stress. This naturally increases the resistance to tear of the laminated structure as a whole.

In manufacturing the improved laminated paper structure of the present invention, webs of glassine may be separately coated on one surface with the laminant composition and then, with the coated surfaces facing each other, passed into the nip of a pair of pressure rolls, at which point the preformed glass fiber scrim is fed in between the laminant-coated glassine webs, and the resulting laminated structure pressed together to embed the scrim in the laminant and to unite the glassine webs together. Owing to the relative resistance of the glass fiber strands to flattening pressures in the laminating operation, the pattern of the strands tends to stand out visibly in the surfaces of the laminated web or sheet, but this will depend upon the weight of glassine used, which may be between 15 and 45 lbs. per ream of 500 sheets, 24 x 36 inches, and upon the weight of laminant per unit of surface area and its degree of flowability under the conditions of laminating.

The moisture vapor-proofness of the laminated sheet depends to a large degree upon the concentration of microcrystalline wax in the laminant. For best results, the weight of microcrystalline wax used should be within the range from 10 lbs. to 40 lbs. per ream of 3000 sq. ft. of paper. When the amount of microcrystalline wax is held between these values, the moisture vapor transmission rates of the laminated sheet vary between 0.01 and 1.0 gram per 100 sq. in. per 24 hrs., when subjected to the standard moisture vapor transmission test.

The number of strands of the glass fiber scrim running in the cross-machine direction and in the machine direction may be the same or may be different, depending upon whether it is desired that the finished sheet have an especially higher tear strength in a given direction. In this case, the arrangement of the fibers in the scrim network can be such that there are more fibers per unit length in the direction where the highest tear strength is to be achieved, as compared with the other direction. Ordinarily, the scrim has about four strands to the linear inch in either direction but a wider or closer mesh may be used.

For some purposes, it is desirable that the laminated wrapper have heat sealing properties. For such uses, the glassine plies 11 and 12 of the laminated structure can be coated on one or both of their outer surfaces with a continuous film of a heat sealing moisture vapor-proof lacquer. In Figure 3, the finished product is shown as containing two such lacquer films 19 and 20 on opposite sides of the wrapper. The base of the heat sealing, vaporproof lacquer contains an elastic film-forming material which may be a cyclized rubber, nitrocellulose, a vinyl resin, or the like. In order to provide adequate vaporproofing properties without impairing the flexibility of the wrapper, the amount of heat sealing lacquer applied to each side should vary in the range from about 2 to 6 lbs. per ream of 300 sq. ft.

A suitable heat sealing lacquer for the purposes of this invention can be prepared by mixing 85 parts by weight of "Pliolite" (a cyclicized derivative of natural rubber) with 15 parts by weight of a paraffin wax having a melting point between 135° and 137° F. To this mixture is added 1.5 parts by weight of a rubber antioxidant such as "Santovar A" (an alkylated polyhydroxy phenol). The resulting dry mixture is dissolved in a sufficient amount of toluol and ethyl acetate to produce a lacquer having a total solids content of about 20%.

The laminated product of the present invention also has improved grease-proofness. When the product was tested in accordance with the usual turpentine penetration test, both in the flat as well as in the creased condition, the turpentine penetration time in both instances was more than 72 hours. Even after the product had been aged for 168 hours at a temperature of 140° F., the turpentine penetration time of the creased sheet was still more than 72 hours.

The mechanical strength properties of the laminated product are also well in excess of those required in usual reinforced wrapper structures. For example, the laminated wrapper of the present invention had strength properties exceeding those called for in the specification for JAN-B-121, Type I, Grade C, which requires a bursting strength of 60 points and a tearing strength of 425.

It will be evident that various modifications and variations may be effected without departing from the scope of the novel concepts of the present invention.

We claim as our invention:

1. A reinforced, laminated paper product having a moisture vapor transmission rate of between 0.01 and 1.0 gram per 100 square inches per twenty-four hours, a greaseproofness represented by a turpentine penetration time in excess of seventy-two hours, a bursting strength of at least 60 points and a tearing strength of at least 425 points, said product comprising superimposed plies of glassine paper, a permanently tacky and flexible laminant joining said plies and consisting essentially of microcrystalline wax having a melting point within the range of about 150 to 160° F., a reinforcing fabric of glass strands extending both in the machine and cross-machine direction of the paper with the intersecting portions of said glass strands held together by a tacky water-repellent composition, said laminant being present in an amount equal to between 10 and 40 pounds per 3000 square feet of surface extent thereof and said fabric being embedded in said laminant and being capable of movement therein relative to said glassine paper plies, and a continuous film of heat sealing moisture vaporproof material adhering to at least one exterior glassine paper surface.

2. A laminated paper product comprising a pair of superimposed glassine paper plies, a permanently tacky flexible and adhesive laminant providing a continuous film interposed between said plies and adhering the same together, and a glass fiber scrim including intersecting fiber strands running in the machine and cross-machine directions embedded in the film, said laminant consisting essentially of microcrystalline wax having a melting point within the range of about 150° to 160° F. and being present in an amount equal to 10 to 40 pounds per 3000 square feet of surface extent thereof, and said laminant securing said fibers to each other and to said plies while accommodating limited relative movement therebetween.

3. A laminated paper product comprising a pair of superimposed glassine paper plies, a permanently tacky flexible and adhesive laminant providing a continuous film interposed between said plies and adhering the same together, a glass fiber scrim including intersecting fiber strands running in the machine and cross-machine directions embedded in the film, and a tacky water-repellent coating on said strands providing adherence at points of intersection therebetween, said laminant consisting essentially of microcrystalline wax having a melting point within the range of about 150° to 160° F. and being present in an amount equal to 10 to 40 pounds per 3000 square feet of surface extent thereof, and said laminant securing said fibers to each other and to said plies while accommodating limited relative movement therebetween.

4. A laminated paper product comprising a pair of superimposed glassine paper plies, a permanently tacky, flexible and adhesive laminant providing a continuous film interposed between said plies and adhering the same together, a glass fiber scrim including intersecting fiber strands running in the machine and cross-machine directions embedded in the film, and an asphalt coating on the strands running in at least one direction providing adherence between the strands at their points of intersection, said laminant having the composition:

65–85% microcrystalline wax melting at 150°–160° F.
5–25% hydrogenated rosin
1–10% polyisobutylene
2–15% elastomeric polymer and the laminant being present in an amount equal to 10 to 40 pounds per 3000 square feet of surface extent thereof, and said laminant securing said fibers to each other and to said plies while accommodating limited relative movement therebetween.

References Cited in the file of this patent

UNITED STATES PATENTS 1,753,281    Barstow et al.  ---------- Apr. 8, 1930

(Other references on following page)

UNITED STATES PATENTS

| | | |
|---|---|---|
| 2,181,160 | Shankweiler | Nov. 28, 1939 |
| 2,293,246 | Fay | Aug. 18, 1942 |
| 2,317,730 | Calvert | Apr. 27, 1943 |
| 2,329,179 | Beh | Sept. 14, 1943 |
| 2,360,109 | Converse | Oct. 10, 1944 |
| 2,561,781 | Bruce | July 24, 1951 |
| 2,575,257 | Boulware | Nov. 13, 1951 |
| 2,610,939 | Fisher et al. | Sept. 16, 1952 |
| 2,620,851 | Brown | Dec. 9, 1952 |
| 2,677,496 | Maynes | May 4, 1954 |
| 2,696,243 | Holland | Dec. 7, 1954 |
| 2,699,389 | Crandall | Jan. 11, 1955 |

FOREIGN PATENTS

| | | |
|---|---|---|
| 817,841 | France | May 31, 1937 |